No. 732,471. Patented June 30, 1903.

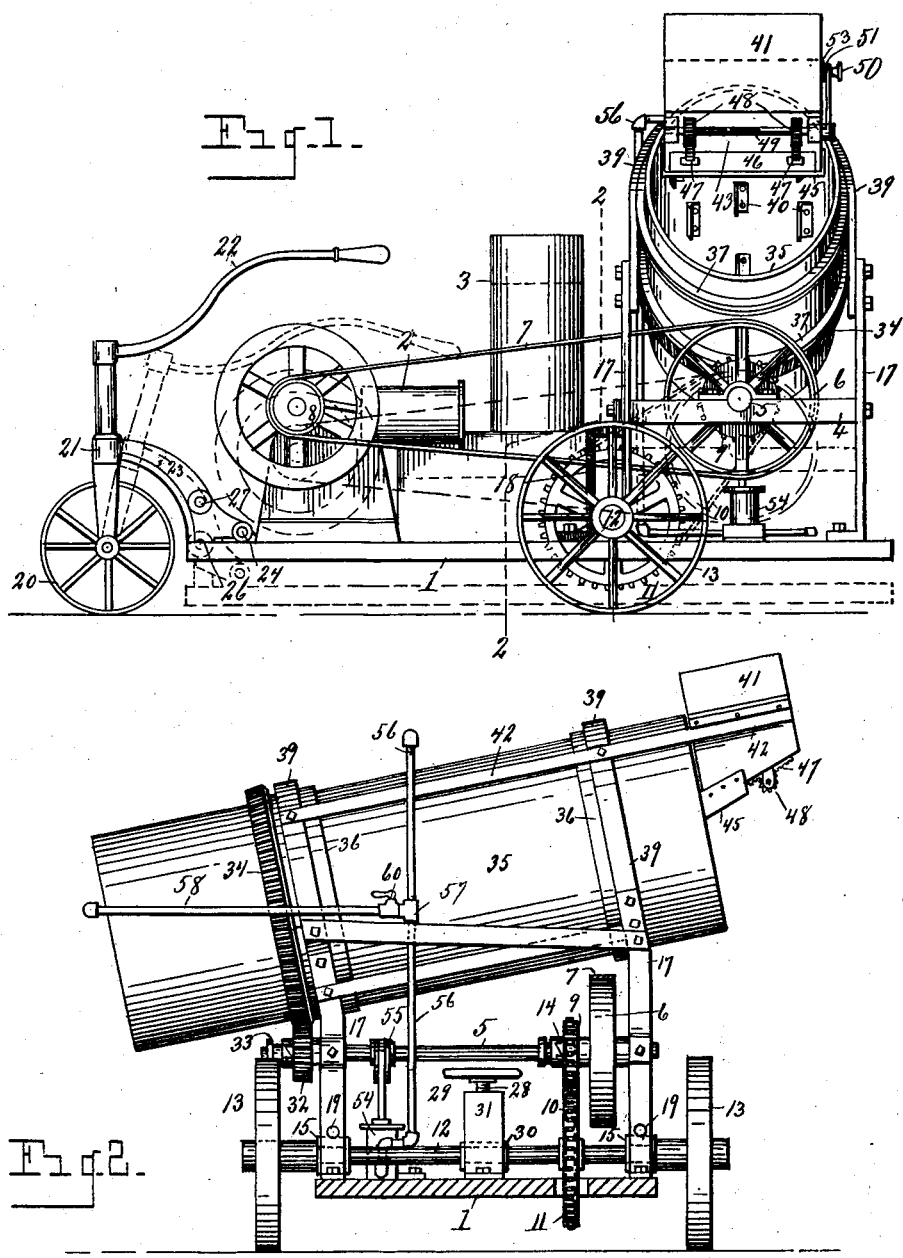

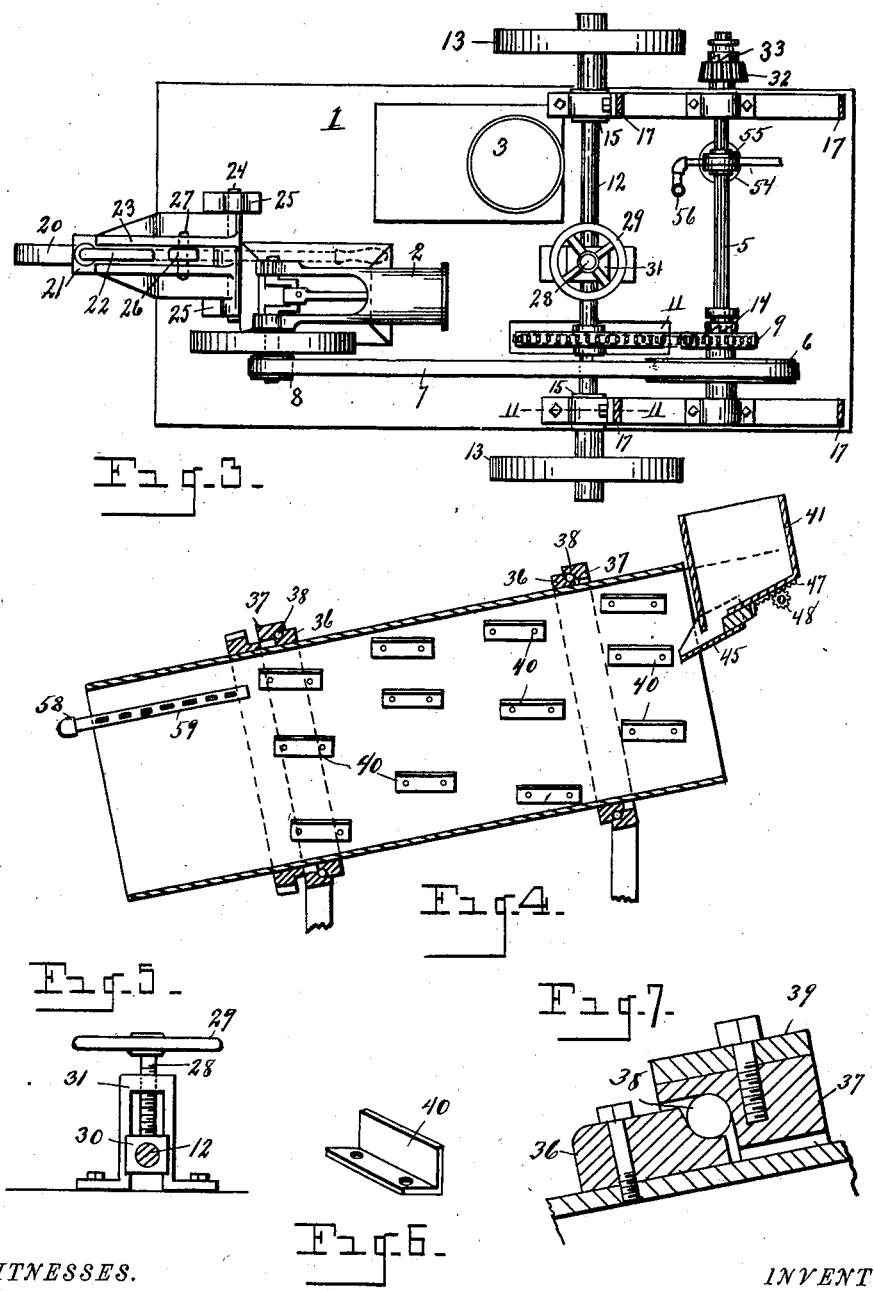

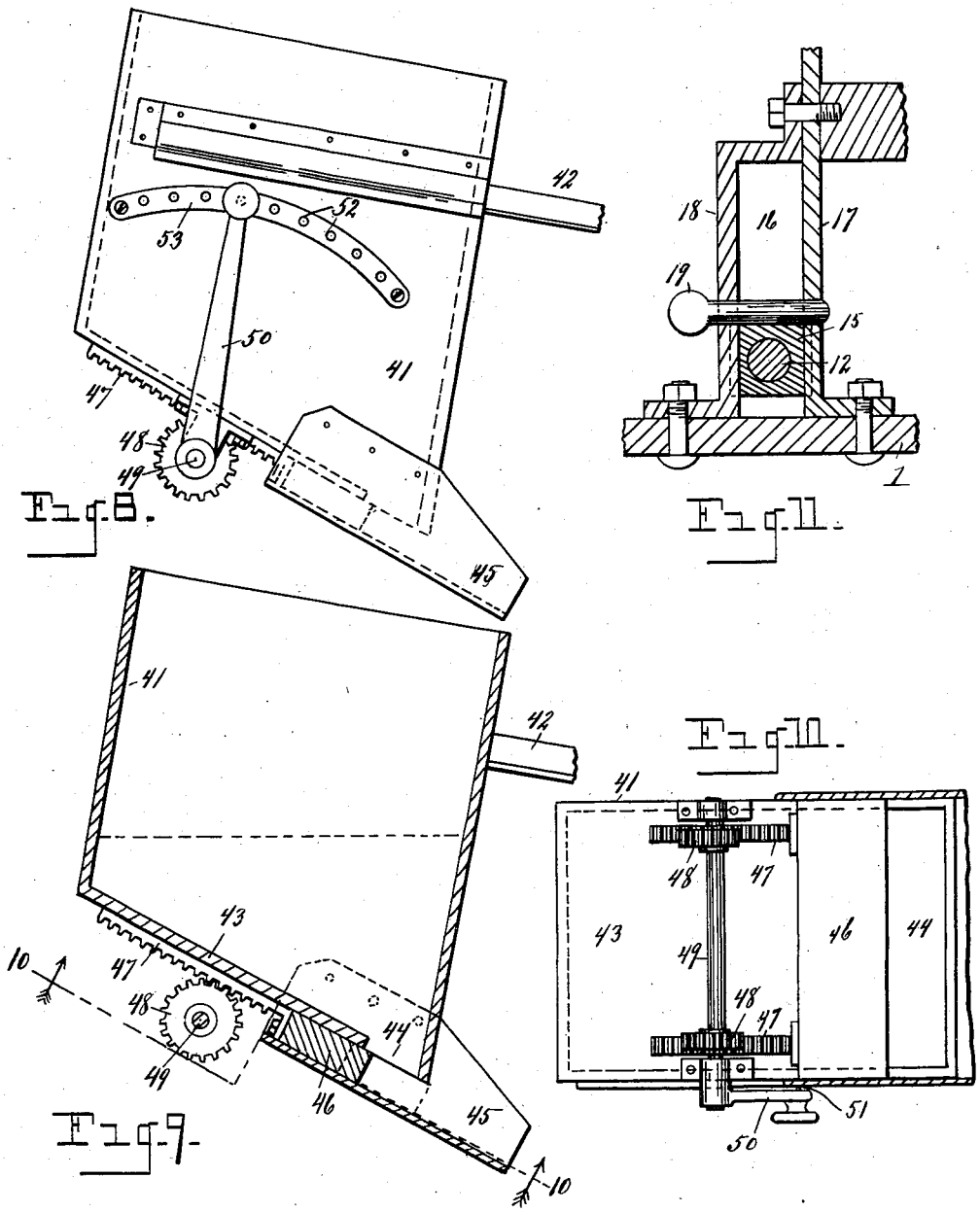

UNITED STATES PATENT OFFICE.

GEORGE SYLVESTER TIFFANY, OF TECUMSEH, MICHIGAN.

MACHINE FOR MAKING CONCRETE.

SPECIFICATION forming part of Letters Patent No. 732,471, dated June 30, 1903.

Application filed November 11, 1901. Serial No. 81,813. (No model.)

*To all whom it may concern:*

Be it known that I, GEORGE SYLVESTER TIFFANY, a citizen of the United States, residing at Tecumseh, in the county of Lenawee and State of Michigan, have invented a new and useful Machine for Making Concrete, of which the following is a specification.

This invention relates to new and useful improvements in machines for mixing concrete; and it consists in the construction and arrangement of parts hereinafter fully set forth, and pointed out particularly in the claims.

The object of the invention is to construct a power-machine of the character described in which the arrangement is such as to afford a firm foundation for the machine when in operation, to provide for thoroughly and evenly mixing the materials before being tempered with water, and to provide for passing the materials through the mixing-cylinder in a manner to economize in the use of power, and to mix the materials in close imitation of the mixing accomplished by the use of shovels.

The above object is attained by the mechanism illustrated in the accompanying drawings, in which—

Figure 1 is a side elevation of a machine embodying my invention. Fig. 2 is a transverse sectional view as on line 2 2, Fig. 1. Fig. 3 is a plan view of the machine with the mixing-cylinder removed. Fig. 4 is a vertical longitudinal section through the mixing-cylinder and hopper. Fig. 5 is an enlarged view in detail of the screw-jack employed to raise and lower the platform of the machine. Fig. 6 is a perspective view of one of the shovels attached to the inner wall of the cylinder. Fig. 7 is a large fragmentary view in section through the ball-bearing rings that support the rotary cylinder and maintain it in position. Fig. 8 is an enlarged side elevation of the hopper. Fig. 9 is a central vertical section through the hopper as shown in Fig. 8. Fig. 10 is a horizontal section as on line 10 10 of Fig. 9. Fig. 11 is an enlarged detail in section through the bearing-box of the main axle and the vertical guideway on the frame or platform which receives said box.

Mounted upon a suitable platform 1 is an engine 2, preferably of the gasolene type, provided with a fuel-tank 3. Journaled in suitable bearings in the frame 4, mounted on the platform, is a shaft 5, having thereon a pulley 6, which is connected by the belt 7 with the pulley 8 on the shaft of the engine, through the medium of which the shaft 5 is driven. Loosely mounted upon the shaft 5 is a sprocket-wheel 9, connected by a chain belt 10 with a sprocket-wheel 11 on the axle 12 of the transporting-wheels 13, whereby said axle may be rotated to propel the machine from place to place. The sprocket-wheel 9 is thrown into and out of gear with the shaft 5 by means of a clutch-collar 14, splined upon said shaft and adapted to be operated by a lever or other suitable means. (Not shown.) The axle 12 is journaled at its opposite ends in boxes 15, adapted to slide in vertical ways 16, (see Fig. 11,) formed by the legs 17 of the frame which supports the mixing-cylinder and the angle-irons 18, bolted thereto and to the platform. The platform is held in a raised position by the pins 19, which pass through the opposite sides of said ways above the boxes 15.

At the front of the machine is a pilot-wheel 20, the stem of whose fork is journaled in a suitable steering-head 21 and carries at its upper end the steering-lever 22, by means of which the machine is directed in its course. Projecting rearwardly from the steering-head is a curved fork 23, the sides of which are pivoted at 24 to suitable clips 25, mounted on the platform. Standing between the sides of the fork 23 and the platform 4 is a post 26, through which and said curved fork the pin 27 (see Fig. 3) is adapted to pass to maintain said parts in their normal position. By withdrawing the pin 27 the platform will be allowed to swing downwardly at its forward end, as shown by dotted lines in Fig. 1. When it is desired to lower the platform, the pin 27 is withdrawn to allow the front end of the platform to swing downwardly upon the pivot 24 of the fork 23, and the rear end of the platform is lowered by unscrewing the jack-screw 28, operated by the hand-wheel 29, and whose lower end bears the box 30, embracing the center of the axle 12. The screw 29 screws through the top of the yoke 31, whose sides embrace the box 30 and serve as a guide therefor as the platform is lowered. It is always desirable to lower the platform when placing the machine in position for operation, and to give it a firm foundation ridges of sand may be provided, upon which the platform may securely rest.

On the end of the shaft 5 opposite to that carrying the pulley 6 is a loose beveled pinion 32, adapted to be made to turn with said shaft by means of a suitable clutch-collar 33, splined thereon and actuated by a lever. (Not shown.) Meshing with the pinion 32 is a beveled gear-wheel 34, mounted upon the circumference of the mixing-cylinder 35 and through the medium of which said cylinder is rotated. The mixing-cylinder 35 is of the requisite length and diameter and is set at an angle to the platform. Mounted upon the periphery of said cylinder near its opposite ends are the bearing-rings 36, which are embraced by external rings 37, and interposed between said rings are the balls 38, upon which the cylinder rotates. The external rings are embraced by metal straps 39, (see Fig. 7,) which are secured thereto and whose ends are bolted to the legs 17 of the frame which supports said cylinder and which stands upon the platform 1. It will be seen on referring to Fig. 7 that the rings 36 and 37 are provided with a concave way in their opposite face which serves as a track for the balls.

To the inner face of the cylinder at its upper end are attached a number of angle-plates 40, whose projecting flanges serve as shovels to engage and carry upwardly the materials as the cylinder rotates. These plates are arranged in series and are secured to the cylinder so as to be in a horizontal position when at the height of the axis of the cylinder. The materials which are fed into the cylinder are carried upwardly by these plates as the cylinder revolves and are discharged from said plates as they traverse the upper arc of the cylinder's circumference, thereby thoroughly mixing the materials within the cylinder. It will be seen that because of the incline of the cylinder the materials as they are carried upwardly by the plates and again discharged onto the bottom of the cylinder are constantly fed longitudinally of the cylinder by said operation, so that said materials are caused to pass through the cylinder while they are being mixed.

The stone and gravel are fed into the upper end of the cylinder by a shovel or other suitable means, while the cement is placed in a hopper 41, which is mounted at the upper end of the cylinder and is supported by the upper connecting-bars 42, which unite the straps 39 and whose upper ends project beyond the cylinder to receive said hopper. The construction of the hopper is shown more clearly in Figs. 8, 9, and 10, wherein it will be seen that the bottom 43 of the hopper is sufficiently inclined to afford a free downward flow of the cement which is discharged through the opening 44, formed in the bottom of the hopper, and falls directly onto an inclined chute 45, secured to the sides of the hopper and projecting within the upper end of the cylinder. Mounted upon the bed of the chute is a slide 46, which is interposed between the chute and the bottom of the hopper and is adapted to close the discharge-opening 44 to entirely cut off the flow of the cement or to regulate the discharge of the cement from the hopper, according to the requirements. The slide 46 is actuated by means of the racks 47 attached thereto and engaging the pinions 48, mounted on the shaft 49, journaled below the bottom of the hopper and carrying an actuating-crank 50. Said crank stands adjacent to the side of the hopper and is provided in its upper end with a pin 51, adapted to engage in either of the apertures 52 of the circle-bar 53, mounted on the side of the hopper, so as to lock the crank in position and hold the slide 46 at any point of adjustment. Cement has a tendency to pack and obstruct any opening through which it is required to pass. By forming the opening in the bottom of the hopper, as shown, the cement is caused to fall directly therethrough, thereby obviating any possibility of clogging.

Mounted upon the platform is a pump 54, driven by an eccentric 55 on the main shaft 5, to which its piston-rod is connected. Leading from the pump is a pipe 56, having a T-coupling 57 therein, from which leads the branch pipe 58, which passes around the rear end of the cylinder and carries a perforated section 59, which projects into the cylinder below the last row of mixing-plates 40. In the branch pipe 58 is a valve 60, by means of which the flow of water through the perforated pipe end may be regulated. The pipe 56 continues above the T-coupling in the form of an overflow-pipe.

It will be observed that the stone, sand, and cement are thoroughly mixed in the hopper end of the cylinder, where the shovel-plates 40 are located, and that they are so mixed in a dry state, thereby obviating the accumulation of cement upon said plates. After the materials have passed the mixing-plate they are tempered with water, which is sprayed into the cylinder through the perforated pipe 59, and are discharged from the cylinder in a condition to be laid. By mounting the hopper at the upper end of the cylinder and supporting it on the ends of the connecting-bars 42 it is slightly agitated through the operation of the machinery, and for that reason the cement is caused to feed more uniformly therefrom.

It will be understood that when transporting the machine from place to place the platform will be raised, but that when the machine is stationed for the making of concrete the platform is lowered onto the ground, so as to afford a firm foundation and relieve the transporting-wheels from the strain of the load.

It will now be understood that in making concrete with this improved machine the cement is placed in the hopper and the slide opened to allow the requisite quantity to pass through into the cylinder. Sand and gravel are then shoveled into the end of the cylinder and are mixed with the cement by the mixing-plates 40 as the cylinder revolves. As the mixed materials pass from the mixing-plates they are tempered with water in the lower end of the mixing-cylinder to the desired degree and are discharged from said cylinder into any suitable receptacle, in which they may be conveyed to the place to be laid.

It is essential to have the platform mounted upon transporting-wheels for convenience in moving the device from place to place; but when positioned for operation in order to secure stability it is necessary to rest the platform upon the ground, and for that reason the platform, with its engine and mixing-cylinder, is made to raise and lower.

Having thus fully set forth my invention, what I claim as new, and desire to secure by Letters Patent, is—

1. In a concrete-mixing machine, the combination of a transportable platform, a mixing-cylinder mounted upon said platform, mechanism also mounted upon the platform for rotating said cylinder, means for lowering and raising said platform carrying said mixing-cylinder and driving mechanism to allow the platform to rest upon the ground when the machinery is in operation and to be raised from the ground while the apparatus is being transported.

2. In a concrete-mixing machine, the combination of the inclined mixing-cylinder, ball-bearing rings supporting said cylinder, connecting-bars uniting said rings and extending beyond the upper end of the cylinder, and a hopper adapted to discharge cement into the cylinder mounted upon the upper ends of said connecting-bars.

3. In a machine for mixing concrete, the combination with a platform and a motor mounted thereon, of an open-ended drum rotatively mounted upon said platform transversely thereof and having its axis of rotation inclined, a pump mounted upon said platform, a cement-hopper supported thereabove and adapted to discharge into the upper end of said drum, a water-discharge conduit connected to said pump and leading into the central portion of said drum, drive connections for said cylinder and pump from said motor, and means for regulating the feed of cement and water whereby the same may be proportioned to the quantity of gravel or broken stone fed into the upper end of said cylinder.

4. In a machine for mixing concrete, the combination with a platform and a motor mounted thereon, of an open-ended drum rotatively mounted upon said platform transversely thereof having its axis of rotation inclined, a pump mounted upon said platform, a valve-controlled discharge-conduit leading therefrom into said cylinder, a cement-hopper supported above said platform and having a discharge into said cylinder, a gate controlling said cement-discharge, a countershaft journaled below and in the vertical plane of said cylinder, a pinion on said shaft and an intermeshing rack upon said cylinder, a pitman connection between said shaft and said pump, and a drive connection between said motor and said shaft.

5. In a machine for mixing concrete, the combination with a platform, of a motor thereon, a rotary mixing-drum mounted upon the platform with its axis of rotation inclined, a drive connection between said motor and drum, a wheeled axle extending transversely of said platform intermediate said motor and drum, and means for raising or lowering said platform upon said axle for the purpose described.

In testimony whereof I have hereunto signed my name in the presence of two subscribing witnesses.

GEORGE SYLVESTER TIFFANY.

Witnesses:
  W. J. INGERSOLL,
  E. L. INGERSOLL.